United States Patent [19]

Knodt et al.

[11] Patent Number: 5,513,017
[45] Date of Patent: Apr. 30, 1996

[54] AUTOMATIC DOCUMENT IMAGING MODE SELECTION SYSTEM

[75] Inventors: Kurt T. Knodt, Rochester; James R. Graves, Ontario; John F. Gauronski, Rochester; Herbert J. Raymor, Holcomb; Randall P. Cole, Webster; K. U. Filomena, Fairport; Frank J. DeNunzio, Webster; David E. Crocker, Fairport; Simon J. Barnett, Macedon, all of N.Y.

[73] Assignee: Xerox Corporation, Stamford, Conn.

[21] Appl. No.: 590,580

[22] Filed: Sep. 28, 1990

[51] Int. Cl.$^6$ .................................................. H04N 1/40
[52] U.S. Cl. ..................... 358/471; 358/498; 358/311; 358/313
[58] Field of Search ........................... 358/471, 444, 358/474, 461, 498; 355/204, 311, 318, 313

[56] References Cited

U.S. PATENT DOCUMENTS

| | | | |
|---|---|---|---|
| 3,945,728 | 3/1976 | Crandell | 355/75 |
| 4,192,607 | 3/1980 | Hage | 355/50 |
| 4,204,739 | 5/1980 | Shoenleben | 339/75 R |
| 4,306,803 | 12/1981 | Donohue et al. | 355/204 |
| 4,526,309 | 7/1985 | Taylor et al. | 355/311 |
| 4,579,444 | 4/1986 | Pinckney et al. | 355/145 H |
| 4,693,590 | 9/1987 | Umeda | 355/14 SH |
| 4,757,348 | 7/1988 | Rourke et al. | 355/6 |
| 4,782,361 | 11/1988 | Spinelli et al. | 355/14 R |
| 4,847,656 | 7/1989 | Kuno et al. | 355/202 |
| 4,925,176 | 5/1990 | Acquaviva | 355/318 |
| 4,933,725 | 6/1990 | Ito | 355/309 |
| 4,939,553 | 7/1990 | Sato et al. | 355/311 |
| 4,947,217 | 8/1990 | Murakami et al. | 355/317 |
| 5,091,971 | 2/1991 | Ward et al. | 358/461 |

FOREIGN PATENT DOCUMENTS

| | | |
|---|---|---|
| 0023544 | 2/1981 | European Pat. Off. . |
| 0193777 | 9/1986 | European Pat. Off. . |

*Primary Examiner*—Edward L. Coles, Sr.
*Assistant Examiner*—Thomas L. Stoll

[57] ABSTRACT

An automatic document imaging mode selection system in a system for generating electronic images of documents, in which documents may be variously fed or registered on a document imaging platen with a plural mode automatic document handling system. Various document handling and/or image scanning modes of operation are automatically selected from among various available potential such modes by accessing various document handling status information and/or sensor inputs, and coordinating that information to automatically select an optimum such mode where the operator has not specifically selected a mode. This may further include automatically determining whether or not to conduct a special pre-scan cycle before image scanning is initiated, and/or taking into consideration inferences as to whether or not the document(s) had been previously imaged. It may further or additionally include automatically changing the registration or scanning position for the particular document in accordance with the mode selection.

8 Claims, 7 Drawing Sheets

| Case # | Last IIT task? | UDH remained closed since last scan? | Current UDH Cover State? | Document sensed in the slot? | Unscanned documents sensed in the RDH tray? | Scanned documents sensed in the RDH tray? | Check for Document on platen? | Document sensed on platen? | System Action |
|---|---|---|---|---|---|---|---|---|---|
| 1 | 1st task after IIT power up | Yes | Closed | No | No | n.a. | Yes-During Power Up Seq. | No | Declare fault "No document to Scan" at Start. |
| 2 | 1st task after IIT power up | Yes | Closed | No | No | n.a. | Yes-During Power Up Seq. | Yes | Select Platen Mode. |
| 3 | 1st task after IIT power up | Yes | Closed | No | Yes | n.a. | Yes-During Power Up Seq. | No | Select RDH mode. If CFF mode is not selected. |
| 4 | 1st task after IIT power up | Yes | Closed | No | Yes | n.a. | Yes-During Power Up Seq. | Yes | Declare fault "Remove Document left on the glass". |
| 5 | 1st task after IIT power up | Yes | Closed | Yes | No | n.a. | Yes-During Power Up Seq. | No | Select SADH mode. |
| 6 | 1st task after IIT power up | Yes | Closed | Yes | No | n.a. | Yes-During Power Up Seq. | Yes | Declare fault "Remove Document left on the glass". |
| 7 | 1st task after IIT power up | Yes | Closed | Yes | Yes | n.a. | Yes-During Power Up Seq. | No | Select SADH mode. |
| 8 | 1st task after IIT power up | Yes | Closed | Yes | Yes | n.a. | Yes-During Power Up Seq. | Yes | Declare fault "Remove Document left on the glass". |

FIG. 4A

| Case # | Last IIT task? | UDH remained closed since last scan? | Current UDH Cover State? | Document sensed in the slot? | Unscanned documents sensed in the RDH tray? | Scanned documents sensed in the RDH tray? | Check for Document on platen? | Document sensed on platen? | System Action |
|---|---|---|---|---|---|---|---|---|---|
| 9 | Platen | Yes | Closed | No | No | No | No | n.a. | Select Platen mode. |
| 10 | Platen | Yes | Closed | No | No | No | No | n.a. | Select Platen mode. |
| 11 | Platen | Yes | Closed | No | No | Yes | No | n.a. | Declare fault "Remove Document left on the glass". |
| 12 | Platen | Yes | Closed | Yes | No | No | No | n.a. | Declare fault "Remove Document left on the glass". |
| 13 | Platen | Yes | Closed | Yes | No | Yes | No | n.a. | Declare fault "Remove Document left on the glass". |
| 14 | Platen | Yes | Closed | Yes | Yes | No | No | n.a. | Declare fault "Remove Document left on the glass". |
| 15 | UDH | Yes | Closed | No | No | No | No | n.a. | Declare fault "No document to scan". |
| 16 | UDH | Yes | Closed | No | No | Yes | No | n.a. | Select RDH Mode. |
| 17 | UDH | Yes | Closed | No | Yes | No | No | n.a. | Select RDH Mode. |
| 18 | UDH | Yes | Closed | Yes | No | No | No | n.a. | Select SADH Mode. |
| 19 | UDH | Yes | Closed | Yes | No | Yes | No | n.a. | Select SADH Mode. |
| 20 | UDH | Yes | Closed | Yes | Yes | No | No | n.a. | Select SADH Mode. |
| 21 | Don't Care | No | Open | No | No | No | No | n.a. | Select Platen Mode. |
| 22 | Don't Care | No | Open | No | No | Yes | No | n.a. | Select Platen Mode. |
| 23 | Don't Care | No | Open | No | Yes | No | No | n.a. | Declare fault "Close UDH Cover". |

*FIG. 4B*

| Case # | Last IIT task? | UDH remained closed since last scan? | Current UDH Cover State? | Document sensed in the slot? | Unscanned documents sensed in the RDH tray? | Scanned documents sensed in the RDH tray? | Check for Document on platen? | Document sensed on platen? | System Action |
|---|---|---|---|---|---|---|---|---|---|
| 24 | Don't Care | No | Open | Yes | No | No | No | n.a. | Declare fault "Close UDH Cover". |
| 25 | Don't Care | No | Open | Yes | No | Yes | No | n.a. | Declare fault "Close UDH Cover". |
| 26 | Don't Care | No | Open | Yes | Yes | No | No | n.a. | Declare fault "Close UDH Cover". |
| 27 | Don't Care | No | Closed | No | No | No | Yes-During Scan | No | Select Platen Mode. Declare fault "No document to Scan" during scan. Abort scan or delete image after scan complete. |
| 28 | Don't Care | No | Closed | No | No | No | Yes-During Scan | Yes | Select Platen mode. |
| 29 | Don't Care | No | Closed | No | No | Yes | Yes-Before Scan | No | Select RDH Mode. |
| 30 | Don't Care | No | Closed | No | No | Yes | Yes-Before Scan | Yes | Select Platen mode. |
| 31 | Don't Care | No | Closed | No | Yes | No | Yes-Before Scan | No | Select RDH Mode. |
| 32 | Don't Care | No | Closed | No | Yes | No | Yes-Before Scan | Yes | Select Platen mode. |
| 33 | Don't Care | No | Closed | Yes | No | No | Yes-Before Scan | No | Select SADH Mode. |

*FIG. 4C*

| Case # | Last IIT task? | UDH remained closed since last scan? | Current UDH Cover State? | Document sensed in the slot? | Unscanned documents sensed in the RDH tray? | Scanned documents sensed in the RDH tray? | Check for Document on platen? | Document sensed on platen? | System Action |
|---|---|---|---|---|---|---|---|---|---|
| 34 | Don't Care | No | Closed | Yes | No | No | Yes-Before Scan | Yes | If CFF has been selected at the UI, declare fault "Remove document left on glass". Otherwise select Platen Mode. |
| 35 | Don't Care | No | Closed | Yes | No | Yes | Yes-Before Scan | No | Select SADH Mode. |
| 36 | Don't Care | No | Closed | Yes | No | Yes | Yes-Before Scan | Yes | If CFF has been selected at the UI, declare fault "Remove document left on glass". Otherwise select Platen Mode. |
| 37 | Don't Care | No | Closed | Yes | Yes | No | Yes-Before Scan | No | Select SADH mode. |
| 38 | Don't Care | No | Closed | Yes | Yes | No | Yes-Before Scan | Yes | If CFF has been selected at the UI, declare fault "Remove document left on glass". Otherwise select Platen Mode. |

FIG. 4D

AUTOMATIC DOCUMENT IMAGING MODE SELECTION SYSTEM

Cross-reference and incorporation by reference as appropriate is made to contemporaneously filed applications of the same assignee including: Attorney Docket No. D/90006 filed Jul. 2, 1990 as U.S. application Ser. No. 07/546,984 by Randall C. Ryon, Lamia Kurtar Canal and Donald R. Tickner entitled "Dual Mode Document Registration System"; issued Jun. 25, 1991 as U.S. Pat. No. 5,026,044 Attorney Docket No. D/90133 filed Jul. 27, 1990 as U.S. application Ser. No. 07/559,020 by James R. Graves and James E. Summers entitled "Scanner Document Absence Code System"; Attorney Docket No. D/90172 filed Aug. 20, 1990 as U.S. application Ser. No. 07/569807 by Gerald L. Coy entitled "User-Friendly Document Input"; issued Dec. 17, 1991 as U.S. Pat. No. 5,072,923 and Attorney Docket No. JAO 26223 (D/90171) filed Aug. 28, 1990 as U.S. application Ser. No. 07/573,825 and entitled "Method of Automatically Setting Document Registration and locating Calibration Strip" by Gerald L. Coy, Kenneth Buck and William Blitz. These other applications disclose the same basic exemplary document handling for electronic platen scanning system as is disclosed hereinbelow.

Disclosed herein is a plural mode document imaging system in which the operating mode may be automatically selected without special operator programing.

Further disclosed herein is an electronic document imaging system which does not require a pre-scan or initial non-imaging pass over the entire imaging platen for every document to determine the presence and/or location of a document thereon, as in, for example, other current products such the Canon Color Laser Copier—200 (the CLC-200) electronic copier announced in 1989.

More particularly, there is disclosed herein an automatic mode selection system in a system for generating electronic images of imaged documents variously fed or registered on a document imaging platen with a plural mode automatic document handling system. There is disclosed an exemplary system for automatically selecting document handling and/or scanning modes of operation from among plural such potential modes by accessing various document handling status information and/or sensor inputs, and using that information to automatically select an optimum such mode where the operator has not specifically selected a mode. This may further include automatically determining whether or not to conduct a special pre-scan cycle before image scanning is initiated, and/or considering inferences as to whether or not the document(s) had been previously imaged. It may further or additionally include automatically changing the registration and scanning position for the document in accordance with the mode selection.

As additionally disclosed herein, said control information may be utilized for providing document input mode selection, operator displays and/or inhibiting or otherwise controlling the operation of an integral document handling or feeding apparatus for feeding documents to said document imaging platen, and/or imaging area or image scanning position selection, and/or preventing potential fault conditions, operator confusion and/or recovery time loss, and/or jams or document damage, especially in cases where a previously manually placed document is inadvertently left on the platen and document feeding of other documents would otherwise be attempted. The exemplary system can also determine if there are any document source conflicts or not, and if there are any such conflicts, prioritization can be provided or image scanning may be inhibited and the operator given a displayed conflict message.

As noted, a principal benefit of the above-described features is that the system does not require the operator to program in where or at what positions to feed and scan the documents from, The operator does not need to program in, by selection switches or other indications, into which document input a document has been loaded, or which prior document imaging mode or input was used in the prior document imaging job. The document image scanning operation can immediately start without operator involvement. That is particularly valuable in re-imaging or otherwise continuing imaging jobs after feeding jams or other interactive scanner fault recoveries, which can be complicated for the operator.

As generally noted in the art, automatic or semi-automatic document feeding is preferred, but there is also a need to optionally manually place onto an imaging platen certain types of documents, such as odd-sized, delicate or valuable originals, transparencies, paste-ups, and books or other bound documents, rather than feeding such documents automatically with a document feeder. However, there is frequently a failure by the scanner or copier operator to remember to subsequently remove such manually placed documents after their imaging, or to change the mode of operation after such a platen mode scan. That can cause document feeding jams or other adverse consequences. This is a well known problem, for which some previous attempted solutions have been provided, as shown by art cited below.

There is additionally disclosed in the embodiment disclosed herein an electronic document imaging system, preferably of the document imaging platen scanning type, having an automatic document registration and presence or absence detection system to produce a unique electrical signal in the absence of an occluding document under desired document input conditions. Thus, the presence or absence of a document previously placed on the imaging platen can be detected in a pre-scan cycle, that is, a special document detection scan prior to a normal imaging scan. However, as will be noted, it is desirable and possible to avoid such a pre-scan cycle in as many modes of operation as possible, so as to improve productivity or document throughput, since such prescanning takes additional time.

The particular exemplary embodiment herein of such a pre-scan document presence detection cycle utilizes the absence of a unique electrical control signal when a unique optical indicia is occluded by a document thereunder in this pre-scan of the imaging system and thus not imaged or "read" by the imaging system to indicate a document is on the platen. The presence of this control signal indicates that the platen does not have a document left on it. This provides a control signal for inhibiting or not inhibiting the operation of a document handling or feeding apparatus for feeding documents to said imaging platen. However, other such pre-scan document on platen presence detection or inference systems can be alternatively employed. Another disclosed feature of that particular exemplary embodiment feature is that the electronic document imaging system may be specially programmed in a document detection mode or special pre-scan mode in certain predefined situations to start scanning the platen in the area of a manual document placement registration position to look for indicia thereof, preferably prior to scanning other imaging areas of the platen. Further disclosed features or advantages of that optional subsystem include the fact that no separate physical document-on-platen sensing devices are required, which could intrude into the optics path to cause image blocking or copying defects. The existing under-platen document imaging (image scanner) system may be utilized. Also, no added electronics or hardware are required for the image scanner, and the presence of almost any type or size document in the manual imaging position can be detected, as long as the document is not fully transparent over the entire area of the overlying unique optical patch or other indicia. I.e., even partial occlusion thereof by document opaqueness or translucence or a document image may be detected by non-reading and non-generation of the entire numerical or other indicia control signal produced by the reading of the fully unobstructed unique optical indicia by the electronic document imaging system.

By way of background, the present system should be distinguished from various prior art systems for simply attempting to detect the presence or absence or position or size of a document on the imaging platen of a conventional optical (non electronic imaging) copier. This has been variously attempted with a conventional separate optical light beam reflective sensors such as, for example, U.S. Pat. Nos. 3,689,143, 4,281,919, 4,344,703, 4,366,219, 4,338,020, 4,456,372, 4,568,181 4,585,332, or 4,391,505 or Xerox Disclosure Journals Vol. 11, No. 1, p. 33, Feb. 1986 or Vol. 12, No. 5, p. 239–40, Oct. 1987; or, in a moving platen system, by reflection of document illumination tamp light, as in U.S. Pat. Nos. 4,357,095, 4,505,574, or 4,659,214. Another way of attempting to detect the presence of a document on the imaging platen of a conventional copier, to inhibit feeder operation, is by inference from opening and/or closing the platen cover, and/or a time delay, such as, for example, U.S. Pat. No. 3,945,728 or Xerox Corporation U.K. 1,745,094 (reissued) (D/72384). The combination of document on platen sensing and platen cover opening sensing is further disclosed recently in Mita EP 0 193 777 and Canon U.S. Pat. No. 4,939,553.

Of particular interest to the subject system, as teaching document handling systems with input prioritization (automatic preferential copying order selection between two separate document feeding inputs), are Olympus Optical Co. U.S. Pat. No. 4,204,739 issued May 27, 1980 to K. Miyashita, et al, and Eastman Kodak Company U.S. Pat. No. 4,192,607 issued Mar. 11, 1980 to Charles T. Hage. Prioritization of displays of jam or other fault sensor conditions in a copier for prioritized diagnostics is taught, for example, in Dutch S.N. 74.11641 laid open Nov. 25, 1974 by Xerox Corporation (D/74161 Holland). Of interest resolving conflicting operator inputs or selected features with a CRT programmable interactive display terminal of a copier with warnings and prioritization is allowed U.S. app. now U.S. Pat. No. 5,049,929 Ser. No. 07/446,517 filed Dec. 5, 1989 by K. K. Anderson, et al, (D/89188).

Also of particular interest, as teaching plural mode document registration systems in which different documents are registered for imaging at different positions on the imaging platen, are Xerox Corporation U.S. Pat. No. 4,782,361 issued Nov. 1, 1988 to R. A. Spinelli, et al, and Xerox Corporation U.S. Pat. No. 4,579,444 issued Apr. 1, 1986 to T. S. Pinkney and H. J. Sanchez. The latter is commercially implemented, with a scanning optics document imaging system, in the Xerox Corporation "1065" copier.

As shown in said immediately above cited Xerox Corporation U.S. patents, different selected document handling modes, which may be selected by the mode selection system disclosed herein, may desirably include different copying modes and/or different document feeding and stopping or registration and imaging positions on the imaging platen. More specifically for electronic image scanning is also noted FIG. 3 and its description of the above-cited Attorney Docket No. JAO 26223 (D/90171) filed Aug. 28, 1990 as U.S. application Ser. No. 07/573,825, now U.S. Pat. No. 5,091,654 and entitled "Method of Automatically Setting Document Registration and locating Calibration Strip" by Gerald L. Coy, Kenneth Buck and William Blitz.

As is also taught in certain above cited and other art, there is a long standing problem in the tendency of operators to accidentally leave a manually placed document on the platen after it is copied, unless it is automatically sensed and the operator is promptly warned by a visual display to remove it. Furthermore, in a normal plural mode document handling system with automatic feeding, if a previously manually placed document is not removed from the platen before automatic feeding of another document, either undesired mechanical ejection of the document or a misfeed or jam may occur. Many of these document-on-platen or document edge detection systems only work with plural platen transport belts with an optical document sensor looking through (optically undesirable) spaces between the belts, or by looking through an optically undesirable or shuttered hole in a document belt.

Further merely by way of background, as to attempting to better optically detect or recognize a document edge or area on a platen for other reasons, an otherwise conventional optical copier, but with a platen cover with marks or patterns of fluorescent paint on the platen cover, is disclosed in U.S. Pat. No. 4,415,261. It is also known to use a yellow belt, or other such colored platen cover, as in Canon document platen feeders, so that the edges of a white document can be better optically detected thereunder by the increased optical contrast as compared to a normal white platen cover.

Specular/diffuse paper sheet distinguishing optical sheet sensors per se are known for example from U.S. Pat. No. 4,540,887. They also illustrate the difficulty of optically detecting documents versus a background surface.

A document edge detection design for a moving document electronic imaging system, using the CCD scanning array itself, in cooperation with a highly reflective target 9, is disclosed in Xerox Disclosure Journal Vol. 8, No. 2, March/April 1983, pp. 161–2.

As to the disclosed exemplary document handler (DH) or feeder per se, it may desirably, with only minor modifications as described herein, be of a type generally known for conventional optical copiers rather than electronic document scanner imaging systems. Disclosed herein by way of example is a known dual document input type, an RDH/SADH. RDH/SADH is a common abbreviation for a well known type of document handler with a top tray loading recirculating document handler (RDH) and an integral alternative side document entrance or SADH slot providing a semiautomatic document handler (SADH) unidirectional input. However, this is merely exemplary, and the present invention is not limited to any particular type of document handler or document feeder.

This disclosed DH system allows documents to be automatically or semi-automatically fed onto an imaging platen at an infeeding position substantially downstream of the upstream end area of a large platen, to provide a shorter feeding path for normal sized documents, yet can utilize the full area of the large platen, including said upstream end area, to stationarily image large or delicate documents manually thereon.

As noted, the subject system is shown being used for document manual placement, or document feeding and registration, for electronic document imaging, for ultimate electronic printing of the electronic document page images after electronic storage and processing and page reordering, rather than a conventional light lens optical imaging copier system, as in most of the art cited herein. An example of such an electronic document imaging and printing system is disclosed in Xerox Corporation U.S. Pat. No. 4,757,348 issued Jul. 12, 1988 to Rourke, et al. That U.S. Pat. No. 4,757,348 and commonly filed U.S. Pat. No. 4,716,438 issued Dec. 29, 1987 also disclose bar coded document control sheets or job tickets, and bar code reading and discrimination and copying controls. That is compatibly usable with the present system, if desired. Among many other examples of platen scanning electronic imaging systems per se are Xerox Corporation U.S. Pat. No. 4,295,167 or related U.S. Pat. No. 4,287,536. By way of background art on various document feeders specifically for electronic (digital) imaging, noted are Xerox Corporation U.S. Pat. Nos. 4,506,301 (filed Oct. 12, 1979, re the Xerox GIS 150 product in the Library of Congress); 4,380,389; 4,451,030; 4,496,984; and 4,607,951.

Also as to specific hardware components of the subject apparatus, it will be appreciated that, as is normally the case, various such specific hardware components are known per se in other apparatus or applications, including that described in art cited herein, and need not be re-described herein. A unique one of the optical bar code patterns (a unique bar coded number not corresponding to any job or document code) disclosed in the above-cited Xerox Corporation U.S. Pat. No. 4,757,348 or U.S. Pat. No. 4,716,438 may be used for the different purpose described herein. Particularly noted re the servo driven document platen transport belt and registration system, etc., is said Xerox Corporation U.S. Pat. No. 4,579,444, issued Apr. 1, 1986 to Pinckney and Sanchez (D/84074), and art cited therein, and the corresponding Xerox Corporation "1065" copier RDH. Said '444 patent is of appropriate background interest as illustrating the general nature of the specific embodiment of the disclosed document handler and platen. The disclosed infeeding baffle or feed-on flap is somewhat similar to that shown in Xerox Disclosure Journal (XDJ) Vol. 7, No. 4., July/August 1982, p. 275.

The prior art also points out the undesirability and disadvantages of using fixed gate or stop finger registration systems into which a document is driven or impacted. These and other references teach the desirability of the present exemplary system in providing alternative automatic document feeding with non-slip engagement of the platen transport belt with the document, and variable document registration by a controlled stopping position of the transport belt holding the document, rather than by mechanical gates, fingers, or edge stops engaging and stopping the document.

As noted in the prior art, as xerographic and other printers, copiers and imaging systems increase in speed, and become more automatic, it is increasingly important to provide higher speed yet more reliable and more automatic handling of the document sheets being copied or imaged, i.e. the input to the copier or printer. Even with slower copying rate copiers or scanners, it has become increasingly desirable to provide an automatic document handler (ADH) or feeder (ADF) for automatic feeding from a stack of documents, with the document handler providing all the deskewing, feeding and final registration of the documents into the copying position, and then ejecting the documents from the platen automatically. It is desirable to reliably feed and accurately register for copying document sheets of a variety or mixture of sizes, types, weights, materials, conditions and susceptibility to damage.

Original document handling, particularly for delicate, valuable, thick or irregular documents, is often more difficult and critical than feeding plain paper sheets. The images on documents (and/or their fusing if they are themselves copies), can change the sheet feeding characteristics. These document images may be subject to damage in feeding if not properly handled, especially smearing of freshly typed typewriting ink, ink jet printer ink, etc.. Original documents can vary widely in sheet size, weight, thickness, material, condition, humidity, age, etc.. Documents may have curls, wrinkles, tears, "dog-ears", cut-outs, overlays, tape, paste-ups, punched holes, staples, adhesive, or slippery areas, or other irregularities. Unlike copy sheets, which generally are from the same new clean batches and are therefore of the same general condition and size, documents can often vary considerably even if they are all of the same "standard" size, e.g., letter size, legal size, A-4, B-4, etc.. Documents, even in the same document set, may have come from different paper batches or have variably changed size with different age or humidity conditions, different imaging or fusing, etc.. Yet it is desirable to automatically or semi-automatically rapidly feed, register and copy even a mixture of sizes, types, and conditions of documents without document jams or document damage and with each document correctly and accurately aligned to a desired registration position on the imaging platen.

As noted in the prior art, one of the most difficult to achieve features for automatic document handling is the rapid, accurate, reliable, and safe registration of each document at the proper position for copying. Conventionally the document is desirably either center-registered or corner-registered (depending on the copier) by the document handler automatically at a pre-set registration position relative to the copier platen. At this registration position, two orthogonal edges of the document are aligned with two physical or positional (imaginary) registration lines of the copier platen at which the original document is properly aligned with the copier or electronic scanner optics for correct imaging of the document image. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents. As noted in the above-cited Xerox Corporation U.S. Pat. No. 4,579,444, the desired registration (imaging) position of a document may desirably vary with document size in some cases.

A preferred type of document handling system is one that can utilize an existing or generally conventional optical imaging system. That is, utilizing the external transparent copying window (known as the platen or imaging station). It is also desirable that the document handling system be readily removable, as by pivoting away, to alternatively allow the copier operator to conventionally manually place documents, including books, on the same imaging platen. Preferably in document handling systems the document is automatically registered for copying overlying a selected portion of full-sized (full-frame) platen which is at least as large as the largest document to be normally copied. In such systems the document is preferably either scanned or flashed while it is held stationary on the platen in the desired registration position. The document is preferably registered by being stopped and held during imaging at a preset registration position over the platen glass which is adjacent one side or edge thereof.

As shown in the art and discussed herein, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying, as well as registering the document.

As noted, since forward edge-registration by mechanical or "hard" stopping of the document edge against a mechanical edge, finger or gate is known to be undesirable, other systems have been developed, as shown in the art. As shown in the above-cited Xerox Corporation U.S. Pat. No. 4,579,444 or U.S. Pat. No. 4,621,801, art cited therein, etc., document registration can desirably be done without such mechanical document stops on the platen. This can be done by pre-registering the document to a platen transport belt with an upstream, off-platen, pre-registration document edge sensor, fingers or rollers, and then moving the document a known, preset, distance over the platen on the belt into registration, providing there is no slippage during this entire movement between the document and the belt, i.e., stopping the document platen transport after a preset time period or movement to stop the document on the platen.

Integral side or lateral registration and side edge deskewing of the document is known to be highly desirable. However, such lateral or second axis (side edge) document registration is known to preferably be done upstream of the platen.

Some other current examples of prior art recirculating document handlers are disclosed in U.S. Pats. Nos. 4,076,408; 4,176,945; 4,278,344; 4,330,197, 4,466,733; and 4,428,667.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged, or copied in the copier onto the "copy sheet", which may be abbreviated as the "copy". Related, e.g., page order, plural sheets of documents or copies are referred to as a "set". A "simplex" document or copy sheet is one having its image and page number on only one side or face of the sheet, whereas a "duplex" document or copy sheet has "pages", and normally images, on both sides, i.e., each duplex document and copy is considered to have two opposing sides, faces, or "pages" even though no physical page number may be present.

A specific feature of the specific embodiment disclosed herein is to provide a document imaging system, with a document imaging platen and an electronic document imager for electronically imaging a document in an imaging position on said imaging platen, and operator control inputs; the improvement comprising a plural mode automatic document handling system for variously feeding and registering various types of documents for said electronic imaging on said imaging platen and an automatic mode selection system for automatically selecting document handling modes of operation from among said plural potential modes by providing a plurality of document handling system status information and sensor inputs and accessing said plurality of document handling status information and sensor inputs and said operator control inputs to derive control information to automatically select an optimum said document handling mode of operation without requiring selection of said document handling mode with said operator control inputs.

Further specific features provided by the system disclosed herein, individually or in combination, include those wherein said automatic mode selection system automatically determines whether or not to conduct a special document-on-platen detection cycle before said electronic imaging of the document on said imaging platen is initiated in response to a preselected combination of said document status information and sensor inputs, and, if said special document-on-platen detection cycle is conducted, it then becomes a part of said automatic selection of said optimum document handling mode of operation and wherein said special document-on-platen detection cycle comprises pre-scanning said imaging platen with said electronic document imager in an initial non-imaging pre-scan pass for indicia indicative of the presence or absence of a document previously manually registered and left on said imaging platen, and/or wherein said special document-on-platen detection cycle is conducted only in special limited cases, and/or wherein said automatic mode selection system includes the consideration of inferences as to whether or not said document(s) had been previously imaged, and/or wherein said inferences as to whether or not said document(s) had been previously imaged comprise document tray document presence sensors and/or sensing means indicative of the prior lifting of said automatic document handling system away from said imaging platen, and, wherein said automatic document handling mode of operation selection automatically changes said imaging position on said platen for said document in accordance with said automatic mode selection.

Another disclosed specific feature is to provide in an imaging system for generating electronic images of documents, in which documents may be variously fed and registered on a document imaging platen with a plural mode automatic document handling system providing a selectable plurality of document handling and imaging modes of operation and associated plurality of document handling status information and sensor inputs, and an associated manual operator mode selection interface system, an automatic document imaging mode selection system is provided for automatically selecting a particular said mode of operation, when a said mode has not been selected by the operator with said manual operator mode selection interface system, by accessing various of said document handling status information and sensor inputs and combining that information to automatically select therefrom an optimum such mode of operation. This may further include automatically determining whether or not to conduct a special pre-scan cycle before image scanning is initiated, and/or taking into consideration inferences as to whether or not the document(s) had been previously imaged. It may further or additionally include automatically changing the registration or scanning position for the particular document in accordance with the mode selection.

The disclosed apparatus may be readily operated and controlled in a conventional manner with conventional or other control systems, using the present teachings. Some additional examples of control systems for various prior art copiers with document handlers, including sheet detecting switches, sensors, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270; and 4,475,156. It is well known in general, and preferable, to program and execute such control functions and logic with conventional software instructions for conventional microprocessors. This is taught by the above and other patents and various commercial copiers and printers. Such software will of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems. As shown in the above-cited art, the control of exemplary document or copy sheet handling systems in printers or copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc.. The resultant controller signals may conventionally actuate various conventional electrical solenoid or cam-controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Known copying systems utilize such conventional microprocessor control circuitry with such connecting switches and sensors for counting and comparing the numbers of document and copy sheets as they are fed and circulated, keeping track of their positions, counting the number of completed document set circulations and completed copies, etc., and thereby controlling the operation of the document and copy sheet feeders and inverters, etc..

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example(s) below, as well as the claims. Thus the present invention will be better understood from this description of an embodiment thereof, including the drawing figures (approximately to scale), wherein:

Figure 3:
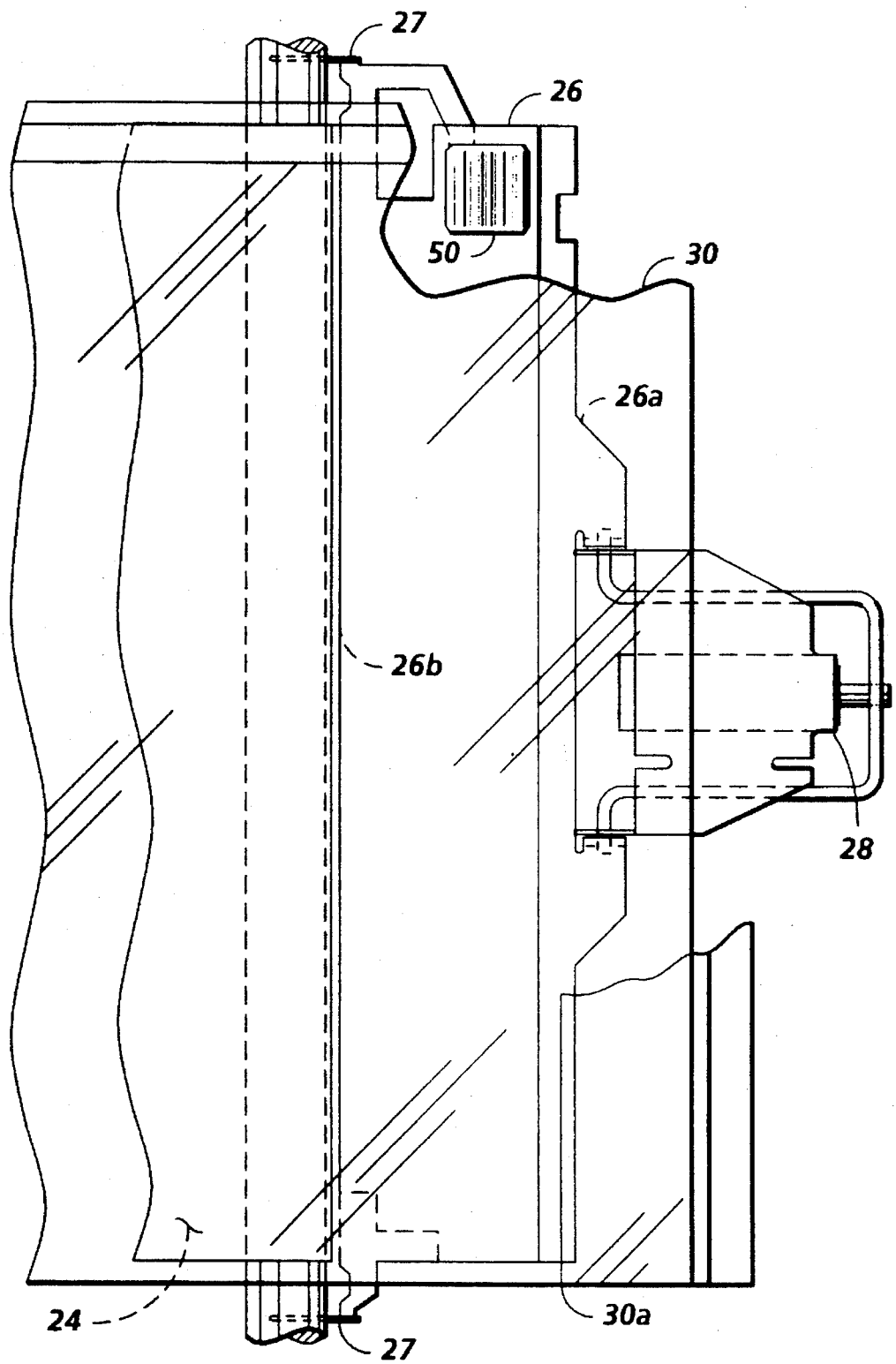

FIG. 3 is a partial bottom view, looking up through the platen in its upstream corner area, which in this example is the manual document placement imaging area (the corner registration position for manually positioned documents), to view the exemplary overlying optical bar code indicia on the baffle plate overlying this platen area which is used in this example for pre-scan document on platen detection; and FIG. 4 (4A–4D) is a table providing the mode selection chart for the exemplary disclosed mode selection system.

Describing now in further detail the exemplary embodiment with reference to the Figures, in this disclosed embodiment, an exemplary integral plural mode document handling and electronic imaging system 10 has a plural mode document handler and, an electronic document imaging system 11. The UDI (universal document input) 20 provides a choice of several different operator document input modes and locations to the imaging platen 30 of the electronic document image scanner. As will be further described below, these exemplary disclosed modes comprise here an RDH (recirculating document handler sequential sheet feeder) input mode, an SADH (semi-automatic document handler) input mode for individual documents, a CFF (computer form feeder) input mode (in this example having the same input as the SADH mode), a manual document placement on the platen mode called a platen mode, and a book or other bound document manual platen placement mode. These plural modes of document input and automatic or manual document handling are variously known in the optical light/lens copier art, as opposed to electronic imaging systems.

In this specific embodiment example, there are bound document (or book) and CFF modes which may be preselected by the operator to provide input selection signals, but the other modes are automatically determined by the system when the operator indicates or selects the start of document scanning, without requiring any operator mode selection or indication. That is, when the start of scanning is directed, the system checks the various sensors on the UDI/scanner, and also, if needed, first checks for the presence of a previously manually placed document on the platen with a special prescan cycle of the image scanner. The preferred exemplary system for that prescan document presence check cycle is described herein and is also described in the above-cross-referenced Attorney Docket No. D/90133 filed Jul. 27, 1990 as U.S. application Ser. No. 07/559,020 entitled "Scanner Document Absence Code System". Based on this information, the exemplary system determines if there are any document source conflicts or not, and if there are any such conflicts, prioritization can be provided or image scanning may be inhibited and the operator given a displayed conflict message.

The disclosed pre-scan document-on-platen detection and control system utilizes the electronic image scanning system 11, as illustrated. The electronic document imaging system 11 is that for electronic imaging for the subsequent or integral printer operation. That is, the electronic optical scanning system 11 has a primary function of digitally reading document images on the imaging platen 30. In the present system, the same electronic document image scanning system 11 may also be used on command to automatically scan, image and read the unique indicia signature of an exemplary optical bar code patch 50 overlying a preset portion of the imaging platen 30, if that bar code patch 50 is not occluded by any portion of a document present in that same preset portion of the platen 30. Here that preset portion of the platen 30 is the upstream corner area of the platen 30 used for manual document registration, as will be further described. That manual registration position here is desirably conventionally defined by the left edge of a conventional fixed manual registration edge strip member at 30*a*. That also defines the effective upstream platen edge 30*a* in this example. In this particular example, the bar code patch 50 is on a baffle plate 26 which is overlying this preset manual registration platen area position. Also, in this example, this disclosed document-on-platen detection and control system is an integral part of an exemplary integral plural mode document handling and imaging system 10. It will be appreciated that additional mode selections may be provided for fault or jam and/or job recovery cases. Similar inputs may be used.

Referring to the exemplary document handler 20, the particular universal document handler 20 disclosed here is merely one example of a document handler suitable for use with or control by the subject control system. Disclosed in this particular example is one example of an integral universal or plural-mode document handler (UDH) 20. This particular UDH 20 has a special, different, mode of operation for feeding and registering large documents, e.g., 11"×17" or A3 documents. However, this is merely exemplary, and the present invention is not limited to any particular type of document handler or document feeder. In this particular document handler or feeder 20 large documents are preferably either manually registered or fed into the side entrance or SADH slot 22 of the document handler 20, as compared to normal size documents, which may also be inserted there but more typically are stacked in the top or RDH stacking tray 21.

The presence of any documents in the RDH tray 21 is conventionally detected by a conventional optical document presence sensor 81. The optional lifting or opening of the UDH 20 to provide platen access for the manual or platen mode of document placement and imaging is conventionally detected by a conventional platen cover opening switch or sensor 83.

The illustrated exemplary UDH 20 is an dual input RDH/SADH unit very much like that shown in the above-cited Xerox U.S. Pat. No. 4,579,444, issued Apr. 1, 1986, although FIG. 1 there is a reversed, mirror image, or rear view as compared to FIG. 1 here. Thus, this RDH/SADH 20, including its exemplary side or SADH entrance 22, may be basically as described in that patent, except as to the novel aspects described herein. Likewise, the RDH/SADH 20 and its drives and sensors are generally conventionally connected to and controlled by a conventional programmable controller 100, programmed as described herein.

That SADH entrance 22 path feeds documents out to the upstream end of the platen transport belt 24 and onto the platen 30 at an infeeding position 25 there. This infeeding position 25 at which the document is initially fed onto the platen 30 and acquired in the nip therewith of the platen transport belt 24 is substantially upstream of the upstream end 30a of the platen 30. Just upstream of this document infeeding position 25 here is a conventional document edge optical sensor 29 (corresponding to reference 31 in the cited U.S. Pat. No. 4,579,444). Here, there is also an underlying pivotal infeeding area light reflective baffle 26, preferably liftable by a solenoid 28 as will be later described, closely overlays the platen 30 in the area thereof extending from the platen upstream edge 30a to the infeeding position 25. As noted, this infeeding area light baffle 26 is otherwise somewhat similar to that shown and described in XDJ Vol. 7, No. 4, July/August 1982, p. 275.

As is conventional, inserting a document lead edge area of any document into the common SADH/CFF entrance path or slot 22 past the nip 84 of the SADH feed rollers 86 up to the SADH gate 87 activates an SADH document input sensor 80 connected to controller 100. After suitable time delays that signal may also then activate an input display lamp 82 and control the clamping of the nip 84 and the starting of the SADH feeding of the acquired document sheet or web.

Figure 1:
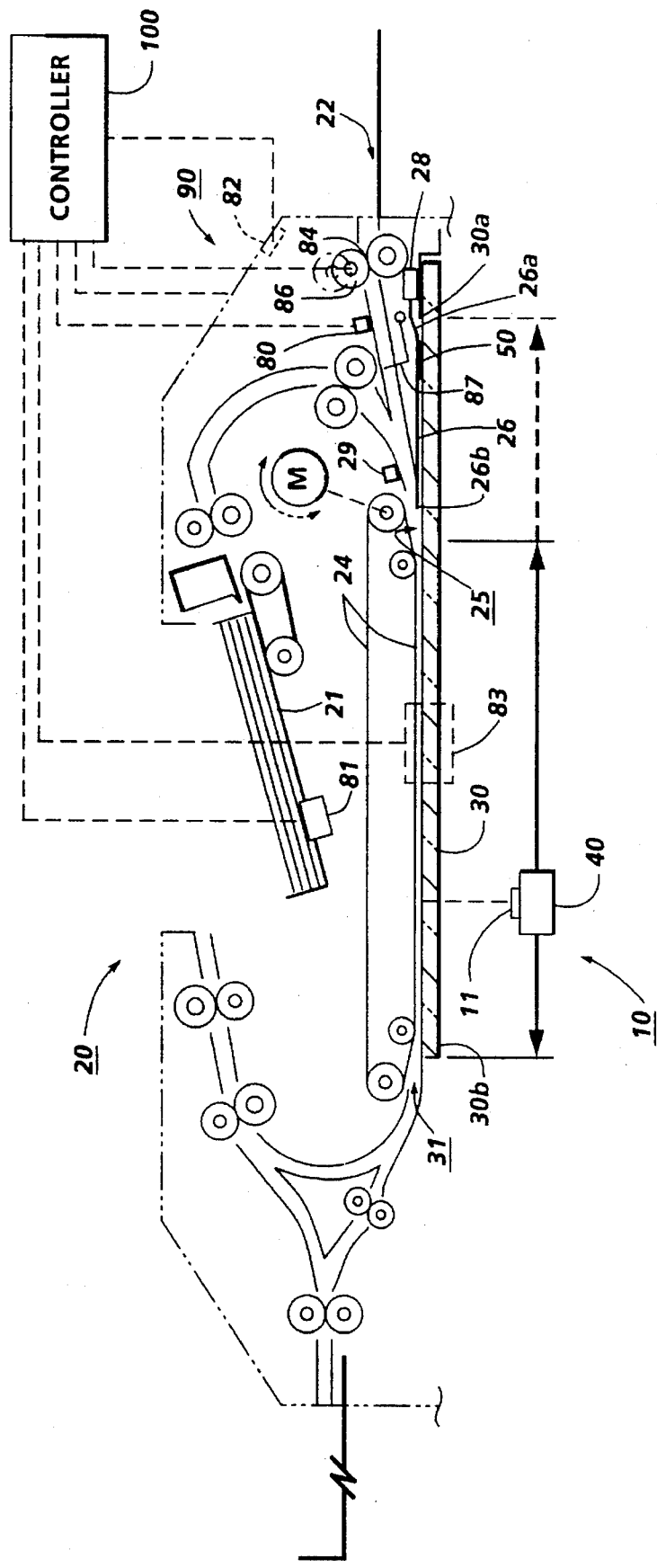
FIG. 1 is a schematic side view of one embodiment or application of the mode selection system of the invention, showing an exemplary universal document handler of a known RDH/SADH/CFF type and an exemplary electronic image scanning system therefor.

Also disclosed here schematically in FIG. 1 is an exemplary electronic image scanning system 11 scanning from under the platen 30 with a scanner 40 which may be mounted on and reciprocally driven by a typical horizontal optical scanning carriage. The electronic image scanning system 11 here provides for selective, programmable, scanning of up to the full length or the entire effective area of the platen 30, (see the movement arrows) to be able to image a document of any size which can be fitted onto the platen 30 upper surface, either manually or by the reverse feeding system also described herein. Preferably, the particular scanning length or distance in any given scan is normally limited to the approximately the length of the particular document being scanned at that time, measured from the desired registration edge position, to avoid unnecessary overscanning and provide faster scanning of sequentially fed and registered documents. However, as described herein, the scanning system 11 is programmable to start an initial scan starting from the upstream end 30a of the platen 30 to insure initial scanning of the area of the uniquely bar coded patch 50 (or scanning of an oversize or manually placed document). Conventionally, a document illuminating lamp and reflector light source may be located on the same scanning carriage.

The electronic imaging member 40 may be generally conventional, with a CCD chip or other electronic imager on which the document image is focused by a mirrors and reduction lens assembly, or the like. The CCD chip can be integral an integral platen scanning mirror/lens assembly, as here, or it may be stationary and imaged by a known scanning optics system, such a full rate/half rate scanning mirrors system. Alternatively, a full width imaging bar or scan head CCD sensor array could be used without mirrors, which may include an an integral conventional lens strip such as a well known Selfoc™ multi-element lens or fiber optics array, as in U.S. Pat. No. 3,977,777, for example. Such electronic digitizing of the document image, for integral or separate digital copying, printing, facsimile transmission, and/or other digital image processing, enhancement, and/or manipulation, is rapidly becoming more important and critical, as compared to conventional copying with conventional light lens optical input, or the like. This is sometimes called an "EFE" or "electronic front end". Above-cited examples included Xerox Corporation U.S. Pat. Nos. 4,757,348, 4,295,167 and 4,287,536. The electronic image scanning may be bidirectional, if desired, as is known for example from Eastman Kodak U.S. Pat. No. 4,150,873 issued Apr. 24, 1979 to G. Dali and Xerox Corporation U.S. Pat. No. 4,205,350. Also, various electronic buffer and page collation systems may be connected to or made a part of the EFE, as disclosed in above-cited references, IBM Corp. U.S. Pat. No. 4,099,254 or U.S. Pat. No. 4,213,694; Eastman Kodak Canadian 1,086,231 or UK 1 531 401; the Xerox Corporation "1200" or "9700" printers, etc..

The following terms are hereby defined with particular reference to FIG. 4 and its accompanying description here. "UI" is the User Interface, in this case the interactive CRT, or liquid crystal or other such known per se operator display and touch area or switch inputs connected to the system controller 100 or ESS. It may also be called a UIT or User Interface Terminal. This UI is where, e.g., Book Mode or CFF Mode are "selected" by the operator in this example. ESS is the Electronic Sub-System or system control. IIT is the Image Input Terminal, also called a scanner in this example, but it does more than just image scan here. Another term for this is EFE or Electronic Front End. IOT is the Image Output Terminal, which writes or prints (with a laser beam) the marks on the (copy) paper. DH is the overall Document Handler, or feeder, also referred to herein as the "UDH" or universal document handler. Referring in particular to the FIG. 4 table headings or mode selection chart headers, the UDH "closed" and "cover state" both refer to the (well known, per se) signal or indicator from the UDH platen cover interlock switch 83, which simply indicates whether or not the UDH is open (or was previously opened, by having stored that signal). [When the UDH is open it is exposing the platen for manual document placement, and disabling the document feeders. If the UDH is closed, it is in its normal document feeding or imaging position.] "Document sensed in the slot" refers to the SADH/CFF document input sensor 80. I.e., SADH/CFF document input here refers to the sensor 80 sensing document input to the separate loading slot 22 of the Semi-Automatic Document Handler (SADH) at one side of the UDH into which either computer form web (usually fan-fold) feeding (CFF) or large or other individual documents may be loaded and fed. "Unscanned documents sensed in the RDH tray" and "Scanned documents sensed in the RDH tray" refers to the UDH top (RDH) tray document presence sensor 81 (see note #2 below) "Check for Document on platen" and its result, "Document sensed on platen", refers in this example to the described pre-scan cycle document presence check to look for the unique bar code to indicate that no document is in the manual registration position on the platen if that bar code can be read.

Describing now the document handling mode selection, the disclosed exemplary system determines which of the five document handling modes (RDH, SADH, CFF, Platen, and Book) the operator is trying to use for scanning. Input parameters therefor in this example include the presence or absence of signals from: the SADH input sensor 80, the RDH tray sensor 81, the UDH interlock sensor 83, an operator UIT 100 "Book Mode" selection, an operator "CFF Mode" selection there, and "document on platen" sensing, preferably done with the described pre-scan system.

The exemplary process/system control requirements therefor will now be described. That is, what occurs to the feature, after operator invocation, to arrive at the result or outcome. As noted above and specifically shown on a full case by case basis in the accompanying "truth table" or mode selection chart of FIG. 4, the system uses the following information to make the mode selection decision: Whether or not Book Mode has been selected at the UI. Whether or not CFF Mode has been selected at the UI. The current state of the RDH tray sensor 81. The current state of the SADH slot input sensor 80. The current state of the UDH cover interlock sensor 83 (opened or closed). Whether or not the UDH cover has remained closed since the last scanning task (last sensor 83 input stored in controller memory). The mode of the last scanning task, stored in controller memory. Whether or not any documents sensed 81 in the RDH tray have been removed from the tray since the last RDH scanning task, per sensor 81. And, whether or not a document is currently on the platen.

The latter determination of whether or not a document is currently on the platen can be made both from inferences made from monitoring the UDH cover sensor status, and, when necessary, by checking for the presence of a document using the platen pre-scan system described herein and in the above-cited cross-referenced application, or another such sensing system for determining if there is a document present on the platen (see above cited references on this for example). Note that such pre-scan document on platen checking is only done in the limited number of situations indicated in the attached mode selection chart or table, so as to minimize scan throughput losses. This is an important advantage of this system.

Note that the table or mode selection chart of FIG. 4 is what was and is actually used by those skilled in this art to write appropriate corresponding software instructions in the particular language desired for the particular ESS (Electronic Sub-System or system control), shown here as the controller 100. Flow charts were not and are not now used.

The exemplary system will make a mode selection determination whenever the operator attempts to start the scanning process by selecting "start scan" or the like at the UI, as follows:

If Book Mode has been operator selected at the UI, and no document is detected in the SADH slot, and there are no unscanned documents in the RDH tray, the system will select Book Mode.

If CFF Mode has been selected at the UI and there is no document sensed 80 in the SADH/CFF slot, a fault will be detected and displayed which indicates that the CFF form is not loaded.

If CFF is selected and a document is selected and a document is sensed in the SADH slot and if a document is also sensed on the platen, a conflict will be raised instructing the operator to "Remove Document left on the platen".

If either the RDH tray sensor indicates that unscanned documents have been loaded into the RDH tray since the last scan (i.e. sensor transition from no documents being sensed to documents being sensed) or the SADH sensor indicates a document has been loaded, and Book Mode is currently selected, a fault will be detected which instructs the operator to either deselect Book Mode to scan the documents in the RDH tray or to remove the documents in the tray to scan the book.

If the operator has not selected a specific mode at the UI, or if the operator has selected CFF mode, and there is a document sensed in the SADH/CFF slot, the system response will be per the attached mode selection chart or table. Note that the term "SADH mode" in this mode selection chart is a generic term covering CFF and also covering SADH cut sheet modes. Thus this system will define which of these two modes to use based on whether or not CFF mode has been explicitly selected at the UI.

When documents are sensed at more than one input location, mode selection will be resolved by using the following priority rules:

1. CFF mode.
2. Book mode.
3. Platen mode, if the document has not been previously scanned (see note #1) and if CFF has not been selected at the UI.
4. SADH mode (Either CFF or SADH cut sheet mode depending on whether CFF has been selected at the UI, as noted above).
5. RDH mode, if the documents have not been previously scanned (see note #2).
6. Platen mode, if the document has been previously scanned (see note #1 below).
7. RDH mode, if the documents have been previously scanned (see note #2 below).

Note #1: The system will infer if the document on the platen has been previously scanned or not by monitoring the UDH cover interlock 83. If the cover has not been opened since the last imaging scan, the inference will be that the document on the glass has already been scanned. If the cover has been opened since the last imaging scan, the inference will be that that document has not been scanned.

Note #2: The system will infer if the documents in the RDH have been scanned or not by monitoring the RDH tray sensor 81 for a "tray empty" signal. If there has not been a "tray empty" condition since the end of the last RDH scanning task or job, the inference will be that the documents in the RDH tray have been scanned. If there has been a "tray empty" condition, the inference will be that the documents have not been scanned.

The following constraints or exceptions apply in this exemplary system. First, as shown in the mode selection chart, the first or initial mode selection immediately after "power on" (i.e., upon initially starting up the system) will be made in a unique manner which is not dependent on the last scanning task or job. Any document sensed on the platen at "power on" will be assumed to have been already scanned for mode selection purposes. Likewise, any documents sensed in the RDH tray at "power on" will be assumed to be unscanned for mode selection purposes.

Another constraint in this example is that, as will be further described below, manually registered documents scanned from the platen (in non Book Mode) must be properly registered at the proper platen registration position for manual document placement in order to prevent incorrect mode selection responses. As explained, that is a constraint only of the particular pre-scan document on platen sensing system disclosed in the detailed example herein, so that the document on the platen will occlude the unique bar code in the platen cover. For the same reason, transparent documents scanned from the platen without selecting Book Mode must be backed up (overlaid) with a blank sheet to prevent incorrect mode selection responses. Very light weight or translucent documents may also need to be backed up with a blank sheet to prevent possible image quality defects, e.g., to prevent print-through of the platen cover bar code, or duplex (reverse side) image print-through.

Any time that Book Mode is selected, no document on platen checking will be done. The system will simply select Book Mode, if there are no documents detected in the SADH slot and there are no unscanned documents in the RDH tray.

If platen mode job recovery is attempted during an interrupted RDH mode two sided duplex document job, and no document is sensed on the platen when START SCAN is selected after the Side 1 Scan has been completed, a conflict message will be raised to remind the operator to Scan side 2 of the missed document from the platen.

A general constraint of this exemplary mode selection process is that the original(s) desired to be imaged next must be placed in the desired document input location before 'start scan' is selected by the operator, since the logic here employs the existing UDH 20 document input sensors.

Referring now again back to the universal document handler 20, there is an additional special mode of operation automatically selected for feeding and imaging oversize documents. In this and most document handlers, normal sized documents may be automatically fed and registered and ejected entirely unidirectionally on the platen 30, in a generally conventional manner, with the servo-driven non-slip platen transport belt 24. Thus, normal size, automatically fed, documents in this disclosed UDH 20 are registered in a registration position entirely under the platen transport belt 24, and downstream from the baffle 26. Thus, the area to be image scanned for such documents need not normally include the optical code patch 50.

However, with this particular exemplary UDH 20, a large oversize document (only) may be initially fed onto the platen 30 in the same manner and direction but then may be automatically treated differently, in accordance with being sensed as being oversized as it is fed in, or as specified as oversized by the host controller 100. The large document feeding continues until the downstream or lead edge area of the large document is overfed past the downstream end 30b of the platen (so that the lead edge area of the document actually briefly enters into the document exit or post-platen ejecting area 31). At that point in time, the trail edge of the oversized document has passed the upstream document edge sensor 29 and the downstream edge 26b of the baffle 26 in passing through the infeeding position 25 so that the length and oversized nature of that document is known by the printer or copier controller 100. An oversized document includes any document which, at the feed-in point, exiting the infeeding position 25, would have any portion thereof extending beyond the downstream edge 30b of the platen 30, and would be imaged that way if handled as a normal document.

In response to the oversize information, the document platen transport is automatically reversed (but preferably operated at a much slower reverse speed than the forward speed), and the document is "backed-up" into a desired copying position registered relative to the upstream platen edge 30a. That same reverse document movement into the large document copying position moves the trail edge area of the large document back under the infeeding baffle 26, under and substantially past the SADH entrance path 22, 24, towards the upstream edge 30a of the platen. The reverse document movement of the oversize document may be stopped as the document reaches a special oversize document registration position of, e.g., about 4.45 mm away from the manual registration position. This special oversize document registration position allows for ample document positioning tolerances. As noted, that manual registration position is at 30a here, and is conventionally defined by the left edge of a conventional fixed manual registration edge strip member, which also defines the effective upstream platen edge 30a in this example. This reverse feeding of the previously trailing edge of the oversized document is into the substantial upstream extension area of the platen extending upstream from the document infeeding position 25 and the platen transport 24 up to close to the upstream platen edge 30a (a distance of preferably more than 10 centimeters). Such a platen extension area per se is also shown in said U.S. Pat. No. 4,579,444 and the corresponding Xerox Corporation "1065" copier. However, there that upstream extension area of the platen is only available for manually placed documents.

It is desirable that the platen transport 24 be smaller and shorter than the platen 30, so as to have a shorter document recirculation loop path length to and from tray 21 for regular sized documents, yet not preclude feeding (rather than manual handling) of larger documents onto the platen 30 for imaging. This is provided here, as described. The disclosed system of automatic document registration allows a smaller RDH to be used, with a smaller overall document recirculation path for normal size documents, on a larger platen, large enough to allow full imaging of substantially larger documents thereon, yet which larger documents are also automatically, rather than manually, fed and registered on the same platen. The disclosed system of automatic document registration allows documents to be fed onto a large area imaging platen 30 at an infeeding position 25 substantially downstream of the upstream end 30a of the large platen 30, to provide a shorter unidirectional path for normal sized documents, yet can utilize the full area of this large platen 30, including the extended platen area upstream of the infeeding position 25, to stationarily image large documents thereon.

As noted, this particular document handling system 20 preferably does not automatically register normal size documents by backing them up under the document input area 25. Normal documents which are fed onto the platen automatically (rather than manually placed on the platen) are registered by unidirectionally feeding downstream into their desired registration position, as described in said U.S. Pat. No. 4,579,444, or otherwise, although here the registration is preferably document trail edge based rather than lead edge based. That is, the normal sized documents are automatically registered and imaged fully under the platen transport belt 24, not under the baffle 26. The backing-up of a document, and the coordinated lifting of the baffle 26 downstream end 26b by solenoid 28 as described herein, is automatically actuated only for documents which are sensed or otherwise indicated as being oversized. All documents are fed in onto the platen 30 through the normal SADH or RDH input path guide baffles leading to input area 25, as shown, which baffles are above the baffle 26. The end of these document entrance baffles provides a document infeeding entrance position at the input area 25 which the trail edge of the documents must clear or exit.

A normal document only passes above, without normally contacting, the baffle 26. However, if desired, in that lowered or normal position the upper surface of the baffle 26 near downstream lip 26b may also provide a low friction guide surface to help guide a lead edge of an incoming document into the infeeding position 25 and into the nip between the platen transport 24 and the platen 30.

For normal sized documents the baffle 26 primarily provides a light baffle or uniform platen imaging light reflective background cover, as noted, to prevent "show around" shadow images outside of the normal sized document area during its imaging. The baffle 26 is preferably a thin lightweight and generally planar light reflective member underlying the document infeeding area 22, 25 and overlying the above-described upstream platen extension area.

Figure 2:
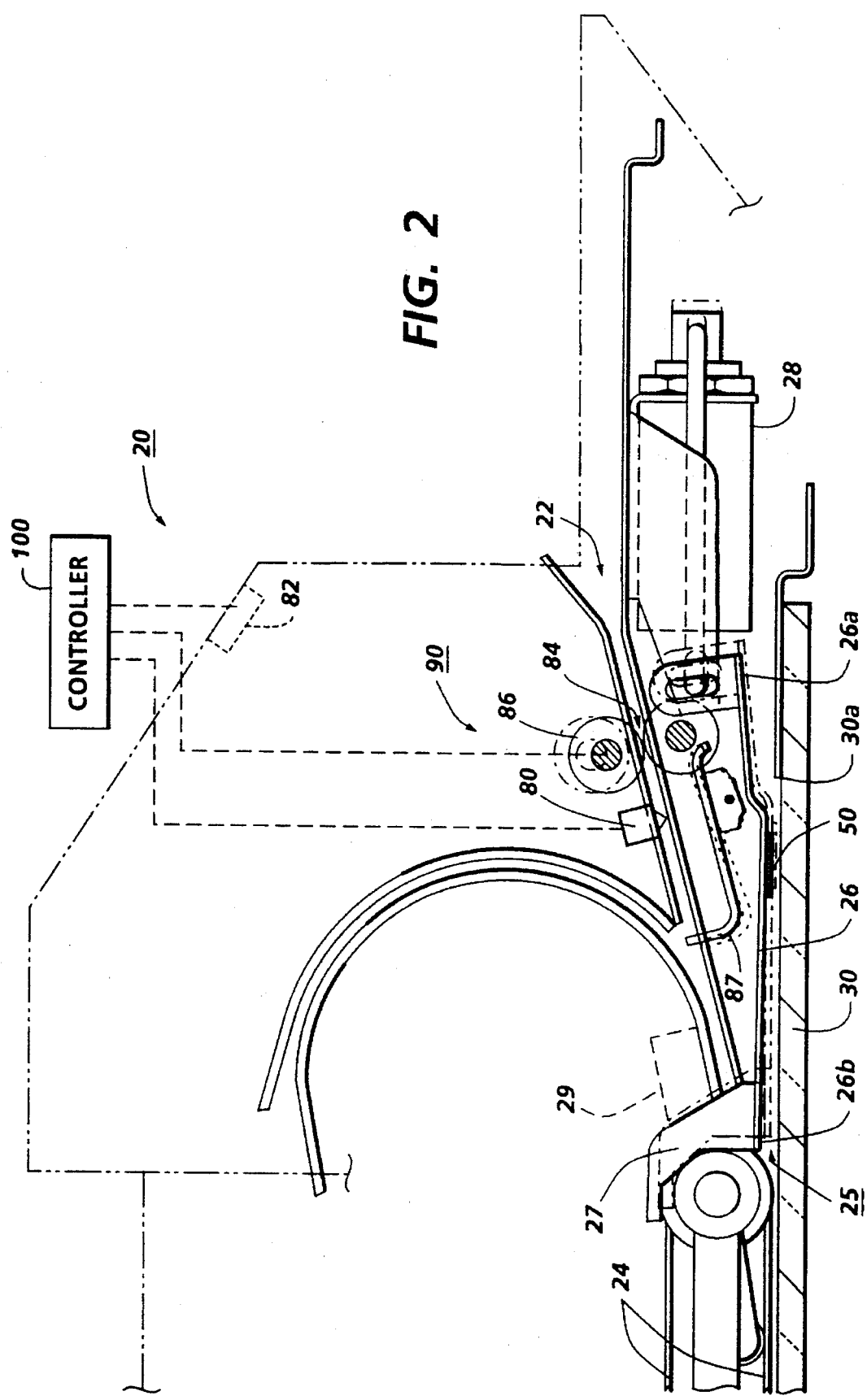
FIG. 2 is an enlarged view of the right hand portion of the document handler of FIG. 1 illustrating the integral SADH/CFF document input area.

To assist in this reverse movement of the large document into the registration/copying position, the baffle 26 here provides another, additional, function. The baffle 26 is preferably pivotably mounted relative to the plane of the platen 30 so as to tilt or be slightly liftable at one edge, as described below or in any other suitable manner, for the reverse movement of an oversize document, so that the baffle 26 can function as a gate or stripping finger to assist in the reverse feeding of oversize documents thereunder. One example, of many possible alternatives, of a mechanism for slightly lifting up the downstream end 26b of baffle 26 is by actuation of a solenoid 28 as shown in FIG. 2. The solenoid 28 may be actuated in timed coordination with the other components of the DH 20, upon sensing of an oversized document, as illustrated in FIG. 3. In the example here, the solenoid 28 is connected to the upstream end 26a of the baffle 26, and horizontal movement downstream of the baffle 26 by actuation of the solenoid 28 causes the inclined planar cam surfaces of lift fingers 27 integral this baffle 26 adjacent its downstream end 26b (but outside of the document path) to ride up on outside extensions of the upstream roller shaft of the platen transport 24. That correspondingly raises the downstream lip 26b of the baffle 26 away from the platen 30 and above the plane of the platen transport belt 24 lower flight. In that raised position, shown in solid lines versus phantom in FIG. 2, the baffle lip 26b and associated (now inclined) lower surface of this baffle 26 in effect becomes a stripping gate or deflector to ensure that the previously trailing edge of the now reversed movement large document will back up under, rather than over, the baffle 26.

When the solenoid 28 is not actuated, the baffle 26 is dropped or lowered into its normal generally horizontal position directly overlying the platen 30, by being lowered substantially into that plane. Preferably the lower surface of the baffle 26 is normally allowed to rest directly and flatly on the platen 30 upper surface by gravity when the solenoid 28 is disengaged. I.e., preferably here the input path of a large document as well as a normal document is above or over the top of the baffle 26, and with the baffle in its lowered position, as previously noted.

The de-actuation of the solenoid 28 to drop the baffle 26 down also helps hold any oversize document area which may be under the baffle 26 down flat against the platen, thus serving as a platen cover for that portion of the document underlying the baffle. The baffle 26 provides a white background imaging area overlying this area of a large document.

Thus, to summarize the UDH 20 special mode of operation in the case of a detected oversized document, preferably the baffle 26 is initially down for document input, raised and tilted during at least the initial reverse movement of the oversized document as it is being reverse fed into a special registration position partially under the baffle 26, and then the baffle 26 is promptly lowered onto that portion of the oversized document before imaging. If desired, the baffle 26 may again be raised temporarily for the downstream document ejection of the oversize document after imaging, so as not to substantially drag on the document as it is being removed. In contrast, in the case of normal sized documents, the solenoid 28 need never be actuated and the baffle 26 can stay down flat directly on top of the area of the platen it overlies at all times.

Turning again to the specific document-on-platen detection system of the invention, as noted above, documents to be imaged by manual rather than automatic document placement on the imaging platen 30 are preferably positioned in a special manual document placement imaging registration position in which one corner of the document is registered to a corner registration position, here at the right front corner of the platen 30 at the effective upstream platen edge 30a defined by a conventional copier fixed registration edge member or ruler. Conventional edge guide marks or registration marks may be provided thereon. This manual document placement and registration is done with the entire document handling unit 20 pivotally lifted up away from the platen 30, as is conventional. That deactuates switch 83, which thus indicates operator selection of the manual, platen copying, mode, if the document handling unit 20 is left up when "START SCAN" is selected. If the operator lowers the document handling unit, the mode is determined by the mode selection chart. Note that this manual registration and imaging position is not the same as the registration position on the platen for fed documents, i.e., documents fed and registered by the document handler 20., as described above. Here, this manual placement document imaging registration position is a different position from the registration and imaging positions on the imaging platen for automatic or semiautomatic document feeding by the document feeder, even though all documents may be read by the same scanned electronic document imager 40.

In the special manual registration position, once the document is in place and the document handling unit 20 is closed down again over the platen 30, the registered corner of the document, of any size, no matter how small (assuming it is not smaller than about 5 mm by 5 mm), is under the optical bar code patch pattern 50 on the overlying stationary imaging background surface member provided by the baffle plate 26. As shown, especially in FIG. 3, the bottom surface of baffle plate 26 is painted or printed with a unique optical indicia, preferably the uniquely numbered optical bar code patch pattern 50. This bar code patch 50 is located directly overlying the above-described manual document registration corner position or area, and is within the depth of field or focus of the electronic document imager 40 when it is scanned thereunder in its normal document scanning path under the platen 30. Thus any manually registered document (except for a clear transparency unimaged in this same corner area, or a document smaller than about 5 mm by 5 mm), will underlie and optically occlude the bar code patch 50 from being read by the electronic document imaging system 11. That is, when the electronic imager 40 is programmed to scan over this area, and there is a document in this area, the imager 40 will not "see" or read the pattern 50 and thus not produce a corresponding numerical code output. In contrast, if no document is present in the manual registration corner the pattern 50 is not occluded and the electronic document imaging system 11 can read the pattern 50 to generate a unique electrical control signal therefrom, e.g., a number such as "99", or the like. All of the bars of the bar code pattern 50 must be unobstructed by any part of a document or document image thereunder for the unique numerical signal to be generated. Thus, a larger area and much more reliable and positive document presence sensing is provided than could be provided by a conventional optical beam document presence sensor. Also, no such additional hardware is required.

The unique bar code pattern 50 is not used on any documents, or on any job slip sheets or job ticket type documents, even though the latter may also desirably be bar coded (to produce different control signals), as described in the above-cited Xerox Corporation U.S. Pat. No. 4,757,348 or U.S. Pat. No. 4,716,438. That is, the bar code pattern 50 may actually desirably be of the same general type as is used for such job separator control sheets fed in lieu of or intermixed with other document sheets, and read by the same imager 40, but the bar code pattern 50 is unique and does not have the same "number" or output signal as is printed on any of such job control sheets.

Preferably the bar code patch symbol 50 overlaps the front or rear edge registration strip of the platen (depending on which platen corner is being used), and is very close (within 3–4 mm) to the upstream platen registration edge 30a defined here by the mechanical registration edge strip shown here on the right hand end of the platen glass.

Manual document registration is not the normal mode of registration with a document handler, since automatic document feeding and registration is faster and more convenient. However, manual registration is a necessary or desirable customer optional feature for especially delicate or flimsy documents, photos, overlays, paste-ups, etc.. As taught in the above and other art, however, a long standing problem is the tendency of operators to accidentally leave a manually placed document on the platen after it is copied, unless it is automatically sensed and the operator is promptly warned by a visual display to remove it. Furthermore, in a plural mode document handling system with automatic feeding, if a previously manually placed document is not removed from the platen before automatic feeding of another document, either undesired mechanical ejection of the document or a misfeed or jam may occur. [A manually placed and registered document is normally also desirably manually removed, requiring lifting the platen cover unit again]. With an electronic imaging system as here, where sequentially imaged document images are being electronically captured and stored for later use, such as for subsequently printing books in collated page order, there is an additional problem in that a document left on the platen may be inadvertently electronically imaged twice. Also, automatic mode selection is not infallible, so an inadvertent second imaging of a document is possible, although unlikely.

This manual registration corner of the platen at 30a is not covered by the platen transport belt 24, and is upstream thereof in the document feeding direction. This is an important distinction, not only for the control system herein, but also since it is not desirable to print such a visible control indicia 50 on the surface of belt 24, which would change position as the belt is driven, become contaminated or worn, etc., in contrast to desirably printing the optical control indicia 50 on a stationary surface, such as the baffle plate 26 here.

To summarize, documents in the other, automatic, imaging positions on the platen 30 provided by automatic or semiautomatic document feeding do not normally occlude the unique optical indicia 50, and the optical indicia 50 is not within these normal fed document imaging positions, so as not to be accidentally imaged or to potentially interfere with the document feeding. Normally those documents fed onto the imaging platen 30 by the document feeder 20 for imaging are registered in a downstream position on the platen calculated from the trailing edge of those documents as fed to and by the platen transport belt system 24, such that the document is completely under this wide friction document belt 24, with the exception only of oversize documents. As noted above, these positions may differ for the different document feeding modes. In contrast, manually registered documents are registered to an upstream edge area 30a of the platen 30 upstream of the platen transport belt 24 and underlying the stationary baffle 26, with the manually registered upstream corner of the document underlying the imprinted unique optical bar code pattern 50.

In the case of oversize documents, even if the bar code 50 is blocked by the oversize document, and that area is scanned, the bar code presence/absence control signal can be suppressed by the controller 100 in that mode, since the controller 100 knows that the system has just fed an oversize document as the last document.

Furthermore, documents manually placed on the platen for imaging are not fed in from the SADH slot or the RDH tray and do not trigger document presence or input sensors 80 or 81, whereas documents loaded therein for automatic feeding do. Also, manually loaded documents are indicated or signaled by the prior lifting of the platen cover, which is conventionally detected by the platen cover opening switch 83.

As noted above, in the present system, the combination of such document inputs and sequences can be used to automatically determine when a document on-platen detection mode or scan sequence is desired. For example, if the platen cover was just lifted, and no documents were loaded for being automatically fed, then manual document loading (a manual job) can be assumed, and no prescan need normally be conducted. In comparison, if automatic document feeding is now being requested by loading of documents into an automatic document feeder input of the DH 20, especially normal documents loaded in the RDH top tray, and especially if the last scan was an imaging scan of a manual job, then a document-on-platen detection prescan may desirably be automatically initiated from that combination of input information.

When it is determined that document-on-platen detection is desired, i.e., when the mode of operation and sensor inputs indicates to the controller 100 program that a platen scan (or prescan) request is appropriate, then, after a platen scanning (document imaging) request has been made, the electronic document scanner 11 first starts a scan adjacent the upstream platen edge 30a, across the area of the unique bar code 50, prior to any document feeding, and prior to scanning other imaging positions on the imaging platen which are provided for automatic document feeding. That is, the system automatically initiates and utilizes a special platen prescan scenario for checking for a document on the platen glass prior to initiating any automatic document feeding sequence. In that special scanning sequence, the absence of a unique electrical control signal by not imaging the unique bar code 50 by the imager 40 in at least in that initial part of that scan (i.e., by not seeing the bar code 50 in that limited area) can be treated as a fault code. The bar code patch 50 may be detected or not detected by the imaging system 11 within the first 5 cm of this special scan. As processed by the image processing electronics, the initial absence of the unique bar code output signal in this special mode indicates that the bar code 50 is occluded by a document thereunder. Thus, even by processing only the first few lines of this special image scan in this arrangement, the controller 100 of the host system 11 has sufficient information to abort any current image capture, and instruct the operator to take corrective action. This provides a control signal for inhibiting the operation of the document handling or feeding apparatus 20, for preventing the feeding of documents to the imaging platen 30 until that sensed document is removed. The conventional operator control screen display (connecting with the controller 100) is also preferably programed to display instructions to the operator to remove the sensed document.

Thus, this same unique control signal information may be utilized for operator displays and/or inhibiting or otherwise controlling the operation of an integral document handling or feeding apparatus for feeding or not feeding documents to the document imaging platen, and/or providing document input mode selection, and/or imaging area or image scanning position selection, and/or preventing duplicate image capture of the same document, and/or preventing potential fault conditions, operator confusion and/or recovery time loss, and/or jams or document damage in cases where a previously manually placed document is inadvertently left on the platen and document feeding of other documents is attempted, etc..

If additional confirmation is desired for the implication from the non-reading of the unique bar code that a document is present on the platen, another scan could be utilized to confirm the indication. The scanner can be utilized to check for a document presence, e.g., by optically looking for a document edge.

While the unique bar code is on a separate baffle member in this specific example, in a scanner with a fixed platen cover or other such platen overlying member a similar bar code could be applied in a similar position and similarly read or not read for sensing the absence or presence of a document on the platen.

It will be appreciated that there is another, optional, type of what is sometimes called pre-scan, which is more appropriately called a "preview" scan, in which, in response to operator selection of a special editing mode, the document is initially scanned, imaged, and displayed (preferably at a lower or coarser resolution) on the imaging editing user interface, and then the document subsequently scanned after editing in the selected image areas at the normal (preferably higher) imaging resolution. The term pre-scan as used herein does not relate to that special mode of operation. As noted, the term pre-scan as used herein refers to an initial non-imaging pass to determine the presence and/or location of a document on the imaging platen.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a document handler for an imaging station with image scanning means, said document handler having plural different operating modes, and said document handler having plural different document inputs for the placement of documents in said document handler to be imaged at said imaging station; said plural document inputs including: means for opening said document handler for manual placement of a document on said imaging station, a document stacking tray of an automatic document separator/feeder for placement of documents therein, and a semi-automatic document feeding input slot;

the improvement comprising automatic mode selection means for the automatic selection of one of said plural operating modes of said document handler;

said automatic mode selection means being controlled by a pre-programmed response to the combinations of the presence of absence of plural control signal inputs from, respectively:

first sensor means for sensing the input of a document to said stacking tray of said automatic document separator/feeder, second sensor means for sensing the input of a document to said semi-automatic document feeding input slot, third sensor means for detecting said opening of said document handler;

user input means for manually selecting additional user-selectable document modes and providing respective said control signals therefore, memory means for retaining said signal from said third sensor means and providing another said control signal input to said automatic mode selection means indicating that said third sensor means has not been actuated by the operating of said document handler since the last operation of said image scanning means;

and selectable means for optically detecting the absence of a document at said imaging station with said scanning means;

said selectable means for optically detecting the absence of a document at said imaging station with said scanning means only being activated in response to a limited number of said combinations of said input signals in said automatic mode selection means;

said automatic mode selection means further including pre-programmed mode priority selections for resolving mode selection conflict where more than one said sensor means is simultaneously activated.

2. The document handler of claim 1, wherein said means for manually selecting user-selectable document modes comprises user selections for a computer form feeding mode and a book copying mode.

3. The document handler of claim 1, wherein said automatic selection of said mode of operation of said document handler by said pre-programmed automatic mode selection means is in accordance with the truth table of FIG. 4 herein.

4. The document handler of claim 1, wherein said selectable means for optically detecting the absence of a document at said imaging station comprises means for at least partially pre-scanning said imaging station for an indicia pattern not occluded by a document.

5. The document handler of claim 1, further including operator display indicia signal means, activated by said automatic mode selection means in response to a preprogrammed fault condition of said control signal inputs thereto for indicating a fault mode to the operator.

6. The document handler of claim 5, wherein said indicia signal means activated by said preprogrammed fault condition includes instructions to remove a document left on said imaging station.

7. The document handler of claim 1, wherein said automatic mode selection means is preprogrammed to minimize said selectable activation of said selectable means for optically detecting the presence of a document at said imaging station with said scanning means.

8. The document handler of claim 4, wherein said automatic mode selection means is preprogrammed to minimize said selectable activation of said selectable means for optically detecting the presence of a document at said imaging station with said scanning means.

* * * * *